United States Patent
Calnan

[19]

[11] Patent Number: 5,490,704
[45] Date of Patent: Feb. 13, 1996

[54] SURVEILLANCE CAMPER TOP

[76] Inventor: Thomas Calnan, 11210 NW. 43rd Ct., Coral Springs, Fla. 33065

[21] Appl. No.: 124,949

[22] Filed: Sep. 21, 1993

[51] Int. Cl.⁶ ....................................................... B60P 3/00
[52] U.S. Cl. ........................ 296/24.1; 49/63; 280/764.1; 296/146.16; 296/164
[58] Field of Search .................................. 296/24.1, 164, 296/167, 201, 146.15, 146.16, 156; 114/340; 89/41.19, 41.17, 41.06; 49/63; 414/498, 608; 410/102, 103; 280/764.1; 359/402, 405, 406, 857, 862

[56] References Cited

U.S. PATENT DOCUMENTS

| | | | |
|---|---|---|---|
| 3,149,878 | 9/1964 | Heermann | 296/24.1 X |
| 3,489,454 | 1/1970 | Manteufel | 296/167 |
| 3,622,193 | 11/1971 | Schmidt | 296/164 |
| 3,796,478 | 3/1974 | Dierkes | 359/405 |
| 4,593,474 | 6/1986 | Mayhew | 280/764.1 X |
| 4,913,458 | 4/1990 | Hamilton | 280/764.1 X |
| 5,228,740 | 7/1993 | Saltzman | 296/201 X |

FOREIGN PATENT DOCUMENTS 2574846  6/1986  France ........................ 49/63

OTHER PUBLICATIONS

J. C. Whitney & Co., Automotive Parts & Accessories #427B 1982 pp. 40 & 45.
J. C. Whitney & Co., Parts & Accessories #466B 1985 p. 20.

Primary Examiner—David M. Mitchell
Assistant Examiner—Kia M. Robinson
Attorney, Agent, or Firm—Malin, Haley DiMaggio & Crosby

[57] ABSTRACT

A surveillance camper module that is transferable from one truck bed to another comprising a complete enclosure adaptable for insertion into the bed of a truck, having an upper volume which disguises the bed as a camper, a lower volume which mates with the truck bed, side windows with barriers that are impervious to outside light for concealing its occupants, a comfortable interior volume with a multitude of surveillance equipment and a plurality of microphones installed around the perimeter of the camper for detecting outside disturbances.

19 Claims, 5 Drawing Sheets

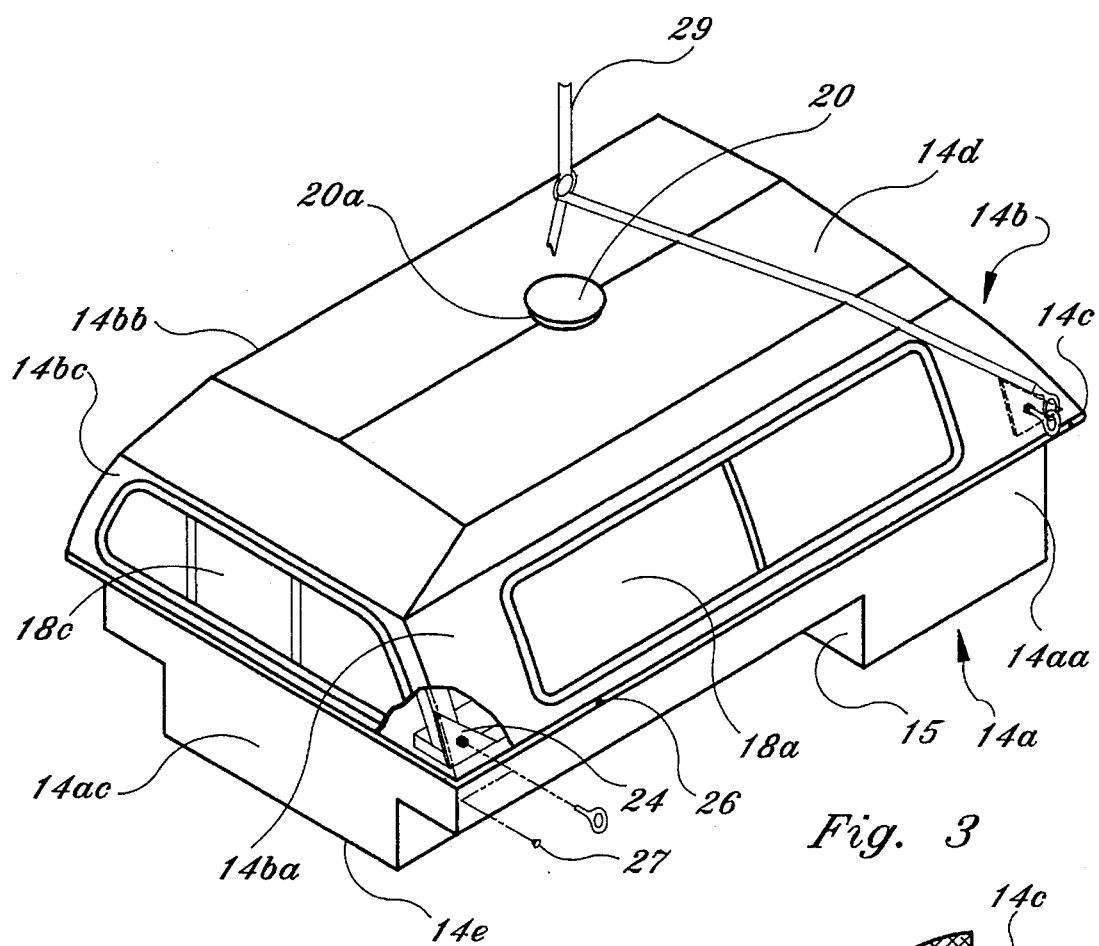
Fig. 3
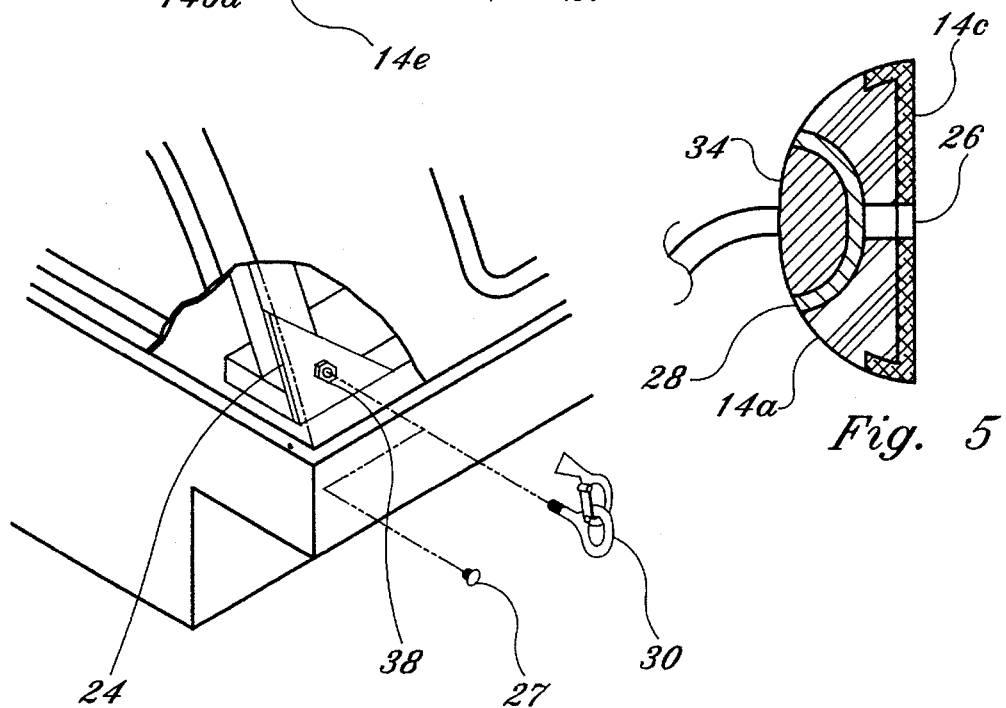
Fig. 4
Fig. 5

SURVEILLANCE CAMPER TOP

BACKGROUND OF THE INVENTION

1. Field of the Invention

This invention relates to a surveillance enclosure having a simulated camper top that is used with a pickup truck bed for surveillance purposes, and specifically, to an inhabitable, self-contained enclosure module having complete electrical facilities for covert surveillance operations, disguised by a camper top, such that the enclosure module can be transferred between a plurality of pickup truck vehicles quickly and readily so that numerous vehicles may be interchangeably used for stakeout or surveillance purposes with the use of a single disguised camper module.

2. Description of the Background Art

Camper tops are well known for use with ½ and ¾ ton pickup trucks which convert the beds into enclosures allowing one to camp out in the vehicle. Typically, the camper tops are fiberglass or aluminum covers that fit over and around the peripheral rim portion of a pickup truck bed and are mounted thereto in a raised fashion. Windows or opening ports are also included in the conventional camper top.

The use of and the need for innovative law enforcement surveillance has become essential in present day law enforcement agencies. Vehicular stakeouts are critically important because of the potential mobility of parties. Unfortunately, for a long term stakeout, it becomes necessary to employ numerous distinct vehicles of different makes and models so that the parties under surveillance will not recognize the vehicle disguised and destroy the cover. Also, it is desirous to have a surveillance vehicle wherein one or more parties conducting the surveillance can utilize the vehicle, while remaining hidden, giving the appearance that the vehicle is uninhabited.

Meanwhile, stealth remains the most important aspect of the enclosure module. Numerous activities are conducted during surveillance, such as, visual watch, video recording, audio recording, and photography. Typically, one person or a team of agents conducts surveillance in conjunction with other law enforcement personnel located in a wide geographical area so that radio communications to and from the enclosure module are also essential. Reception of sounds around the surveillance vehicle are of importance, as well, for the security of the party or parties inside the vehicle. Moreover, construction economy is actually important in wide scale usage of surveillance vehicles to control the costs of law enforcement.

U.S. Pat. No. 4,103,956 issued to Faulstick on Aug. 1, 1978 depicts a pickup truck bed enclosure that is used by workmen for easy access. U.S. Pat. No. 4,746,161 discloses a truck bed device that provides a custom interior for use in the bed of a pickup truck. The purpose of the device is to allow for the easy transfer from heavy duty work within the furnished interior to comfortable relaxation thereafter.

None of the references disclose an inhabitable surveillance enclosure module disguised as a camper top that can be quickly installed and removed for conversion among a variety of different pickup truck beds to extend its use with a large number of individually distinct vehicles. The improved surveillance enclosure includes comfortable facilities for video recording, audio recording and radio communicating through specially disguised openings, viewing ports, and hidden communication antennas. The invention also includes reinforced segments incorporated into the structure of the enclosure module so that the module can be hoisted and lifted with a sling by one person for transfer from one vehicle to another quickly without excessive time and labor. The exterior appearance is one of a normal camper top. The enclosure is self-contained, and once mounted in the truck bed, becomes fully operational, with electricity, communications, video, and even a portable noiseless air conditioning unit. The enclosure module is constructed from two separate sections, joined together rigidly to form a complete, integral enclosure module, including a floor and roof top, that simulates a camper top.

SUMMARY OF THE INVENTION

A transferable surveillance compartment generally comprised of a wood-framed, fiberglass-walled enclosure module, sized to have a lower well portion that conformably fits snugly into the open bed of a utility truck, such as a ½ or ¾ ton truck bed and having an exterior simulated camper top. An actual camper top can be used in the construction of the invention. The upper and lower body well segments forming the enclosure include rigid frames which may be made of wooden boards, such as 2×2's or 2×4's, or other rigid construction materials, to support fiberglass walls, roof, and floor. The upper and lower wells are sealably joined to form a single compartment enclosure volume.

One of the important aspects of the device is that the bottom well and floor configuration are sized and shaped to fit snugly within the utility truck bed without additional connection enhancers. This allows for a standardized configuration adaptable for different makes and models of trucks so that the modular surveillance enclosure is adaptable to a wide range of trucks. This allows for maximum efficiency of resource utilization in the fact that the enclosure modules can be changed quickly from one brand and color truck to another to continue the surveillance operation.

The enclosure module has a somewhat rectangular box configuration with four corners defined by the joining of the upper and lower wells, a ceiling wall, and a floor, all formed as a single integrated unit. At each side wall corner, the wall area includes an internal reinforced metal plate, such as a gusset, mounted to rigid wooden frame members. Each metal plate is connectable to a threaded member that can attach to a sling such as a four-element strap sling, to quickly lift the entire enclosure from one truck bed into another truck bed with a hoist connected to the sling.

The walls of the enclosure module may be framed with wood, including studs and plywood, and an exterior fiberglass shell. The enclosure walls include disguised, hidden, embedded RF antennas (preferably four, one at each corner) within the camper top shell walls, vertically polarized, mounted and positioned for maximum performance. The camper top shell wall conceals the VHF or UHF transceiver, cellular telephone, hand-held transceiver, and intelligence transceiver antennas.

One end of the enclosure includes a slidable door, or a hinged door, that is utilized and adapted to be mounted adjacent the pickup truck tailgate for individual egress and ingress. The enclosure sides and rear side, include conventional appearing windows.

An industry standard fiberglass, or similar synthetic fiber, is employed in the construction of the camper top. This provides the simulation or disguise necessary so that outside and away from the truck, the only visible portion is the standard industry camper top. Accordingly, the surveillance vehicle, while incognito as a typical truck having a camper attachment over the bed, actually provides a low profile, high-tech stakeout station.

The bottom shell is fabricated from a fiberglass mold or similar synthetic fiber, around a wooden frame to match the configuration of the camper top at its open peripheral end and the floor of the bed, wherein the bottom shell and the camper top are permanently joined together as a single unit. The floor, walls, and ceiling are framed with 2×2 and 2×4 wood boards insulated with sprayed-in polyurethane foam to add sound dampening qualities, strength to the rear compartment and thermal insulating capability. The upper camper top portion includes slidable blackout viewing panels mounted back behind the windows to prevent the propagation of light while allowing an occupant inside the surveillance module to view 360° outwardly without being seen from the outside. The rear compartment door abuts the tailgate of the truck and swings up and out for facilitating quick exit or quick entry and is hidden when the tailgate of the truck is up.

The device also includes a front or cab slidable window which slides on a track for opening to allow entry to and from the vehicle front cab as a crawl-through passageway into the surveillance module.

The enclosure compartment roof includes an upper disguised retractable videoscope viewing port to allow for viewing outwardly, or for photography or for video recording with a 360° view.

Inside the enclosure module, a master operations console cabinet is provided, which includes shelving for accommodating the electronic equipment. The console includes a built-in master control panel for use with the designated electronic equipment, such as communications equipment, sound monitoring equipment, and the like. Power to the unit is provided by a 12-volt DC battery, and the master console includes a plurality of 12-volt DC receptacles, such as cigarette lighter receptacles, placed around the shelving area for utilization with various auxiliary electrical equipment. The system further includes an auxiliary power system having a reserve capacity of time based on a 12-volt battery. A gel cell battery is used in the power system having complete sealing to prevent battery gas leakage and venting. The battery is located behind the main control panel at the front of the module. The main operator control panel includes a digital voltmeter for monitoring auxiliary battery voltage, a digital ammeter to monitor current drain in the electronic equipment, and a 24-hour digital clock with manual reset buttons. The battery can be removed through an access cabinet door. The device also includes a 30-amp, pulsed charging, 120-volt AC battery charger in the module for automatic recharging of the auxiliary battery from an exterior power source.

The control panel may include selectable switch control to operate the electronics, including one, two or more still photography cameras, at least one video scope camera, a 24 hour time and date activity recordation clock, a video motion alarm, video monitors, communicating transmitters and receivers, an exhaust fan, fresh air intake fan, gooseneck lights, ceiling light, audio processor, the air conditioner, and other essential or auxiliary electrical components and communication systems. The device further includes a single master power on/off switch for engaging in shutting down the auxiliary power system.

In order to maintain acceptable occupant interior temperatures in particular climates, a wet ice type air conditioner is provided when the motor vehicle's engine and cooling system is shut off. The wet ice air conditioner allows for internal cooling through the melting of ice, such as described in U.S. Pat. No. 5,024,065 issued Jun. 18, 1991 for an air conditioning system for confined spaces.

The floors and compartment interior space may include carpeting or other soft surfaces to allow an occupant to move comfortably or lie comfortably in the compartment. Additionally, the floor wall and compartment space covering may provide installation to maintain comfortable enclosure temperatures.

To utilize the enclosure, first a pickup truck is selected for disguising with a camper top. The entire surveillance module enclosure is lifted by a hoist attached with a sling that is connected to the enclosure walls by four threaded fasteners reinforced by metal rigid plates at the four corners of the enclosure, and lowered onto the truck bed. The enclosure is then firmly attached to the truck bed by hidden connectors and the optional electrical system is connected to the vehicle's electrical charging system. The electronics, the auxiliary battery, and all equipment is housed within the enclosure so that no additional preparation is necessary once the unit is inserted into the truck bed. The user gains access into the enclosure through a movable rear door panel which can be closed from the inside.

When on station, an occupant can utilize video recording, photography, or ocular viewing through the retractable videoscope in the center of the enclosure roof. In addition, ambient sound amplifiers and omni electric microphone receivers are mounted at designated areas hidden within small holes in the exterior wall molding. This provides four sound receivers for receiving, amplifying and transmitting noise from the area around the vehicle for the security of the occupants.

Thus, with the use of the present invention, an economical surveillance unit disguised as a camper truck can be used with a variety of different vehicles which can be quickly and efficiently transferred from one vehicle to another, the entire unit being self-contained.

It is an object of this invention to provide an improved enclosure module for use in a surveillance vehicle.

It is another object of this invention to provide a surveillance enclosure module for use in the bed of a pickup truck that is disguised as a camper top.

Yet another object of this invention is to provide a surveillance enclosure module that can be interchanged between a plurality of different truck beds quickly and efficiently.

Still another object of the invention is to provide an improved structure for a surveillance enclosure disguised as a camper top for use in a pickup truck bed that includes reinforced members for permitting the unit to be transferred by a hoist, while at the same time including hidden electronic and audio devices in the structure walls.

In accordance with these and other objects which will be apparent hereinafter, the instant invention will now become described with particular reference to the accompanying drawings.

BRIEF DESCRIPTION OF THE DRAWINGS

FIG. 3 is a perspective side view of the camper module with a cutout illustrating the hoisting elements.

FIG. 4 is a perspective, exploded view of the hoisting elements.

FIG. 5 is a side elevational detailed view in cross section of a microphone and microphone aperture used with the invention.

DESCRIPTION OF THE PREFERRED EMBODIMENTS

Figure 1:
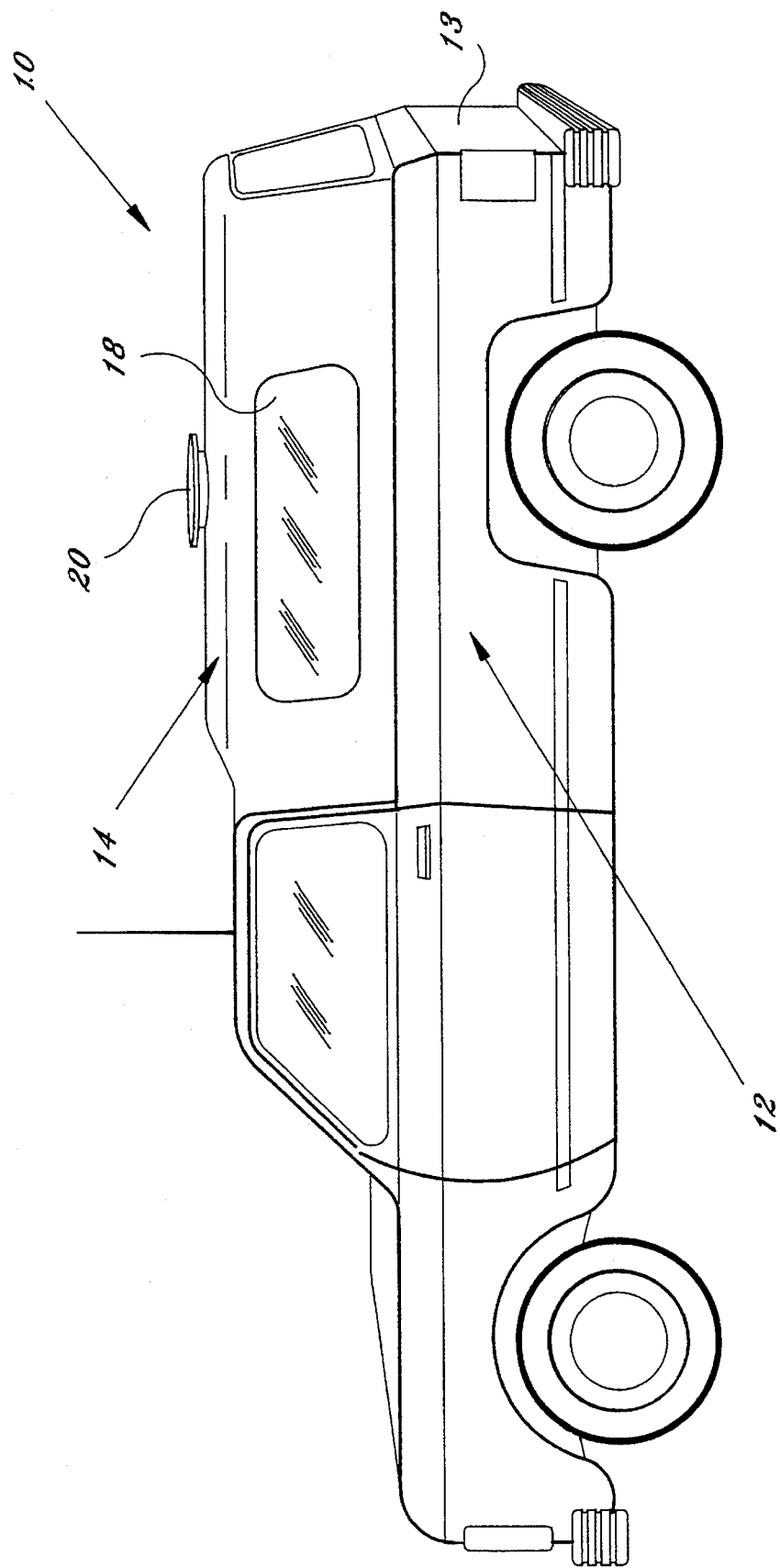
FIG. 1 is a perspective view of the camper enclosure as installed in a typical truck.
Figure 6:
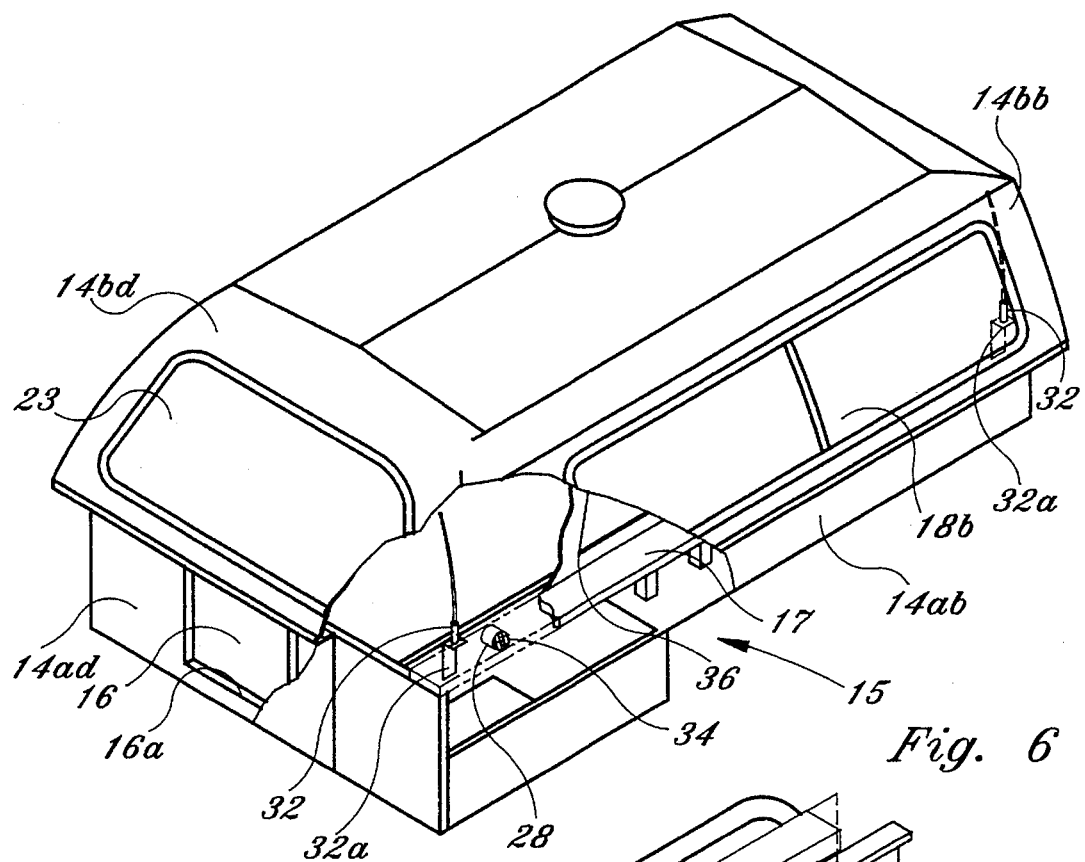
FIG. 6 is a perspective view, cut away, of the instant invention illustrating sidewall cavities and antenna placement.

With reference to the drawings, FIG. 1–9 depict a transferable compartment referenced by the numeral 10, generally comprising a truck bed camper enclosure module 14, a hoisting system, a surveillance volume, an auxiliary power system and other miscellaneous equipment. The camper enclosure 14 comprises a lower well volume retrofit 14a fabricated for sealed connection with an upper enclosure volume 14b to form the shell of the enclosure module 14 having a driver sidewall, passenger sidewall, cab sidewall and tailgate sidewall forming compartment volume 100 shown in FIG. 2. The upper volume 14b is a simulated camper top that is joined with the lower well 14a so that the module 14 is water tight around the seam 14c which further includes a rubber strip 21 to aid in effectuating the seal. FIG. 1 illustrates the truck surveillance module 14 installed in the bed 12 of a typical truck. Referring to FIG. 3 and 6, the upper enclosure volume 14b preferably comprises a truck bed cover having passenger and driver side sidewalls, 14bb and 14ab, respectively, each with slidable windows 18b and 18a, a front sidewall 14bc adjacent the cab, a rear sidewall 14bd which is a hinged door with a window 23 above the tailgate 13, and a roof section 14d joining the four walls to resemble a conventional fiberglass truck bed camper top. The upper front or cab sidewall 14bc maintains a slidable window 18c for gaining access to the cab, while the upper rear sidewall 14bd includes a viewing window 23 for surveillance purposes. The four upper sidewalls define an open, lower peripheral edge which joins with the lower volume 14a. The upper volume 14b, or camper top, is engineered, altered and expanded upon to facilitate connection with the lower volume well 14a to create a transferable surveillance camper module 14 for removable installation in a variety of truck vehicles of different makes, models, and colors. Generally, the bed 12 of a truck is eight (8) feet in length dictating a similar length for the surveillance module. However, that length may vary in accordance with the bed and still fall within the scope of the invention. The lower well volume 14a is a fabricated fiberglass, or similar synthetic fiber, bottom shell constructed to match the camper top 14b open end and to be sealingly joined together as a single unit volume 14. The lower well 14a has a bottom surface 14e with passenger and driver side sidewalls 14ab and 14aa, a front or cab sidewall 14ac adjacent the cab and a rear sidewall 14ad adjacent the tailgate 13. Each of the lower passenger and driver sidewalls, 14ab and 14aa, define recessions 15 for fitting over the wells in the bed 12. In short, the bottom volume 14a is designed to the basic contours of the bed 12 to provide a snug fit. The recessions 15 form the base for the interior seat 102 and the inner frame for the control console 104 (see FIG. 2). The floors, walls and ceiling of both volumes are reinforced with framing supports 19 comprising a plurality of 2×2 and 2×4 wood studs, or similar rigid framing construction material, in substantially horizontal and vertical positions for structured reinforcement. The walls 14a of the camper compartment 14 are constructed for present and future installation of camera and other equipment mounts, such as the Bogen Magic Arm mount.

To construct the surveillance compartment the walls, floor, and roof are stripped with 1×4, 2×2 and 2×4 framing lumber 19, insulated and covered with 5×8¼" AC plywood to form interior sidewalls 13a–13c and cavity 17 therebetween. All wood stripping 19 is attached to the fiberglass shell with epoxy resins. The ceiling is stripped with 1×4 lumber, insulated and covered with 1/4" AC plywood. The window viewing ports, 18a, 18b and 18c, are boxed out with 2×2's or 2×4's and made to slide open so they can be easily used during operations. A plurality of wall mount brackets are built into the compartment for supporting still photography and video cameras, including the Bogen Magic Arm camera mount. In addition, the surveillance module is insulated with 2" sprayed-in polyurethane, formaldehyde-free foam. This insulation provides dampening and thermal retention capabilities to the compartment while allowing for the required and necessary communication transmittals and receivings.

Figure 2:
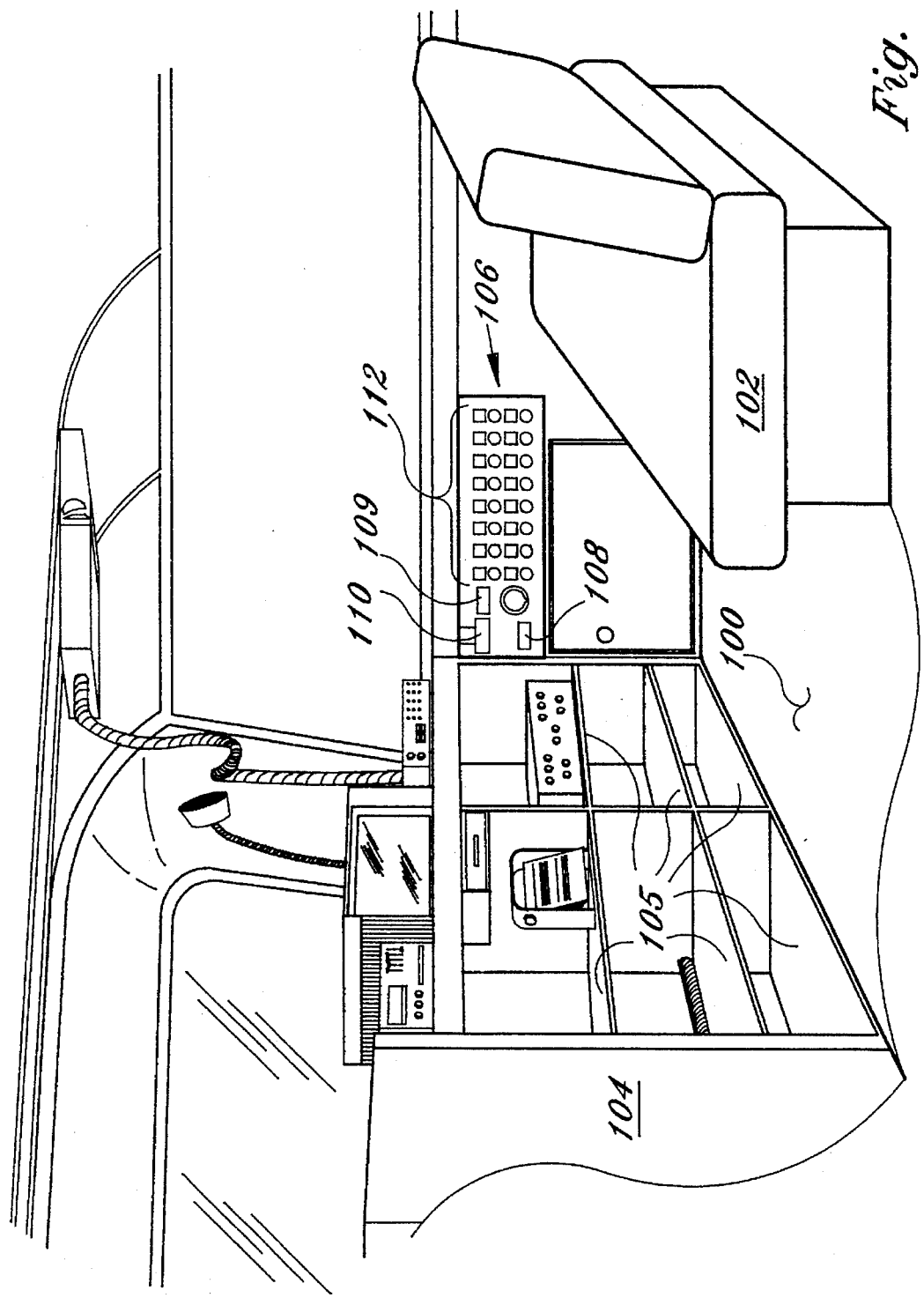
FIG. 2 is a perspective view of the inside of the camper enclosure module.
Figure 7:
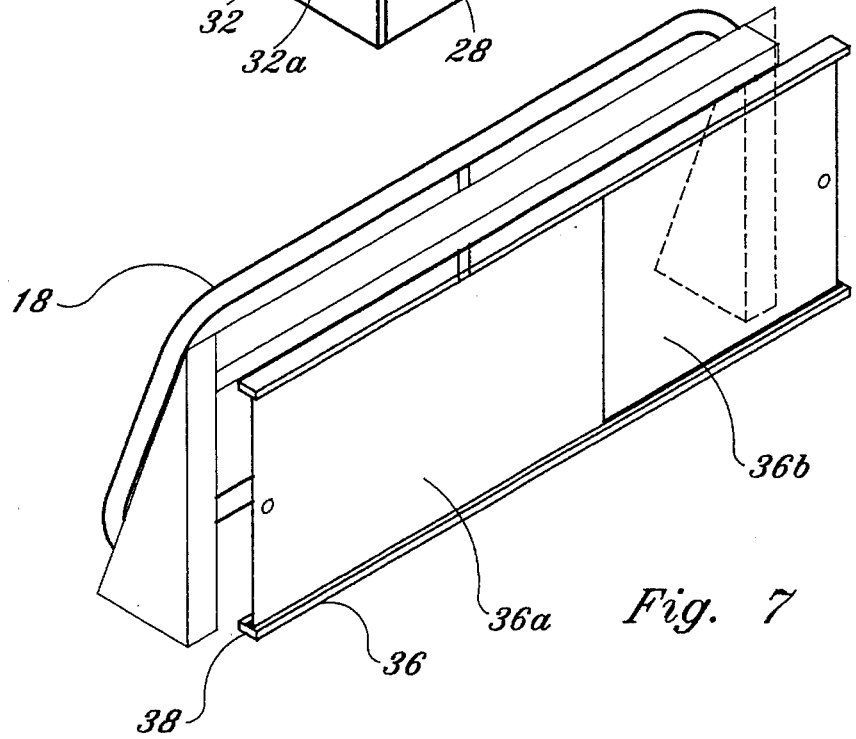
FIG. 7 is a perspective view of the slidable barrier of the instant invention.
Figure 8:
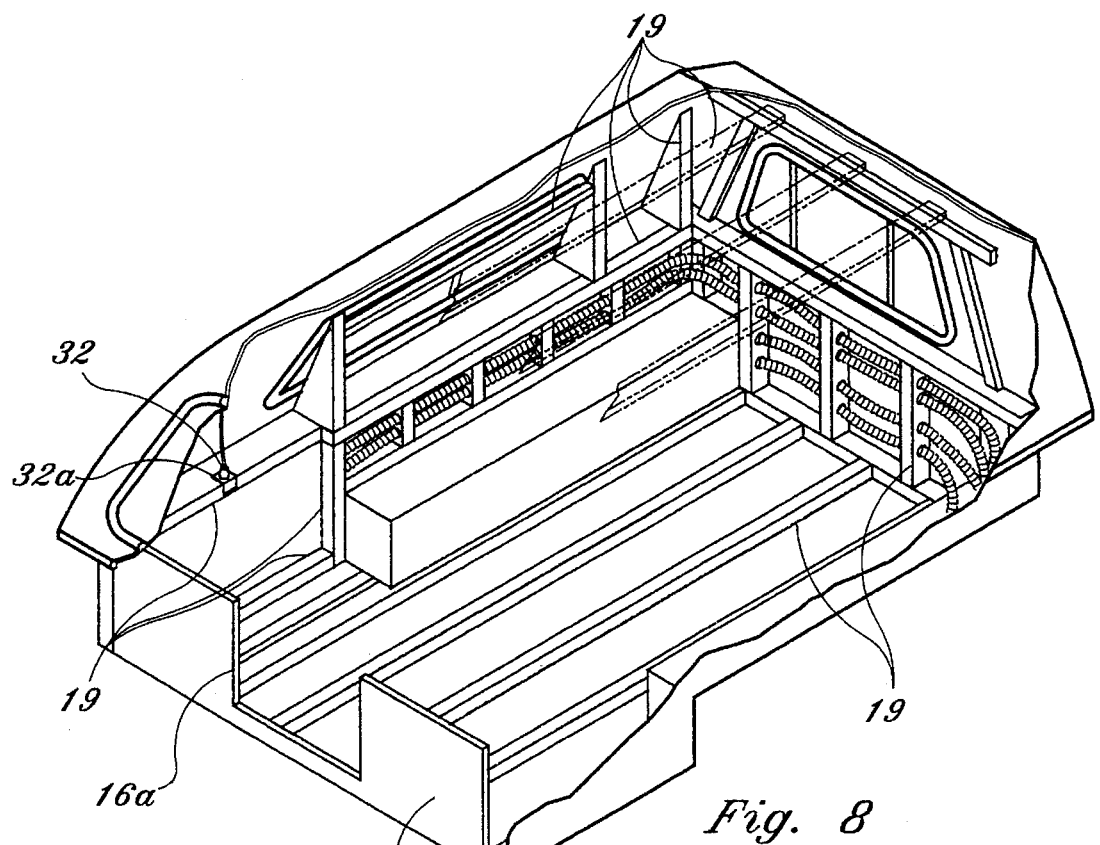
FIG. 8 is a perspective cut away view of the instant invention illustrating the framing of the enclosure.
Figure 9:
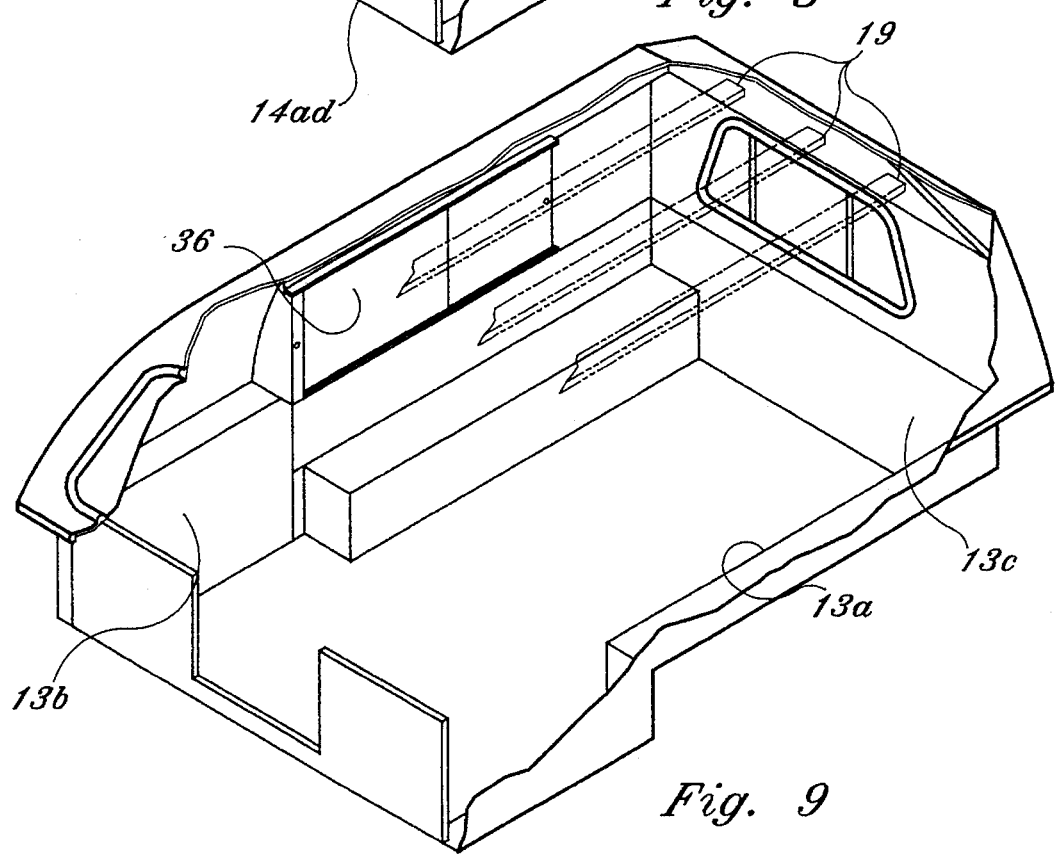
FIG. 9 is a cut away view of the instant invention illustrating the interior sidewalls attached to the framing.

A driver side slidable viewing windows 18a, passenger side viewing window 18b and cab side viewing window 18c are installed in openings defined by the upper driver, and passenger and cab sidewalls 14ba, 14bb and bc of the upper shell 14b to provide for 360° view. As depicted in FIG. 7, the viewing windows each include disguised slidable view ports, defined by slidable blackout panels 36, disposed interior to the viewing windows 18a, 18b and 18c in openings defined by interior sidewalls mounted to the sidewall framing. The blackout panels 36 may comprise two panels 36a and 36b which slide relative to each other forming viewing ports or providing concealment from outside light and view. All compartment and cab side windows 18a, 18b, 18c and 23 are tinted with a neutral grey, medium to high density tint. While each viewing window in the compartment 14 is tinted to prevent the propagation of light into the compartment volume 100 an additional light barrier comprising slidable panels 36a and 36b impervious to light and having dark surfaces is installed in the interior of the compartment in alignment with each of the aforementioned viewing windows. The interior sliding panels 36a and 36b typically comprise a first panel and a second panel which may be longitudinally displaced along a track 38 from one side of the window to the other for positioning of the barrier 36 to make a desired viewing port between the panels 36a, 36b or along either side in any longitudinal position for still photography, video recording or general surveillancing purposes. The viewing portals in each window provides a minimum opening of 6"×8" and is located proximal the roof 14d for permitting optimum viewing angles. The upper rear sidewall or door 14bd also provides a viewing window 23, i.e. the rear viewing window 23, which has a dark film impervious to light from the outside. The cab sidewall 14bc includes a slidable cab window 18c for passage between the cab and camper module 14. The roof 14d of the surveillance module 14 defines an aperture or port 20a for raising a retractable scope 20 up to six (6) inches for recording and view in a 360° spectrum. The scope 20 is set so that it may be as low as 1.5 inches for daytime viewing or in high traffic areas, or six inches high at night for maximum light. The retractable scope 20 is electrically connected to a monitor and operator console, as shown in FIG. 2, to control rotation, viewing, focus, and zoom.

At least four sound receiving and amplifying devices 34, such as microphones are hidden near the corners of the enclosure module 14 in microphone ports 28 proximal the seam for detecting sounds and movement outside the surveillance vehicle to protect the officers. Sound receiving apertures 26 are bored into the module 14, ranging from 1/8" to 1/4", for the passage of sound to the inserted microphones. A rear compartment door 16 (FIG. 6) is provided in a cutout 16a (FIG. 8) defined by the lower rear sidewall 14ad which is hinged for opening and closing to facilitate quick ingress and egress. The compartment door 16 is concealed by the tailgate 13 and lockable for securing the surveillance module 14 at the rear exit. The door 16 is equipped with two locks, the first lock being factory installed and the other an all weather locking dead bolt assembly installed during the construction of the surveillance module. The camper module 14 may also be customized by installing a roof carrier or rack for holding a conventional foot ladder to further disguise the vehicle or to hold other surveillance equipment. Communication between the surveillance compartment and the truck cab is provided by a front topper window 18c which is slidably attached to the camper top 14b where the camper top and cab meet for allowing entry and passage to the vehicle front cab by slidably engaging the window 18c.

The camper module 14 maintains a cavity 17 defined by interior walls 13a–13c and the camper top shell walls 14ba–bc for containing at least four antennas 32 mounted therein. The antennas 32, as disposed within the camper top cavities 17, are preferably raised to the highest point within the wall for maximal performance. Preferably, the camper top shell conceals a VHF or UHF transceiver antenna, a cellular telephone antenna, a hand-held transceiver antenna, and an intelligence receiver antenna, insulating the foregoing from outside view. They are preferably RF antennas vertically polarized on metal support bases 32a, one at each corner, positioned for maximum performance.

In the preferred embodiment, the surveillance enclosure module 14 comprises a transferrable volume 100 or compartment which is easily transferred by hoisting from one truck bed to another, without being limited by the make or model of the truck. The surveillance module 14 is reinforced with steel plates or gussets 24 at each corner and fitted with female threaded ports 28, such as a nut, for mating with threaded eye bolts 30, hooks or other similar hardware. The steel lift plates 24 are approximately 1/2 inch thick and are secured to the frame by welding, hardware or rivets. The plates 24 may vary in dimensions and still fall within the scope of the invention. Welded to each plate 24 is a half (1/2) inch female threaded nut 38, defining female threaded port 28, for mating with half (1/2) inch steel eye bolts 30, or the like, normally three (3) inches long. The plates 24, however, may be machined with a 1/2 inch female threaded port 28 and still comply with the present invention. During operations, the threaded ports 28 are plugged with plastic or fiberglass matching plugs 27 which blend into the aesthetics of the camper top providing concealment for the surveillance vehicle. Four 2" wide 1 ton slings 29 are used for lifting the camper module from one vehicle bed to another. The lifting slings 29 are attached to the module by the eyelets 30 as threaded into the female ports 28 providing secured attachment for lifting. Hence, the module 14 and all the equipment as contained within the volume 100 is easily transferred from one truck 12 to another.

The surveillance module 14 comprised of the lower well 14a and the camper top enclosure 14b defines an internal surveillance volume 100 housing the equipment cabinet or console 104, control panel 106 and seating arrangements 102. The console cabinet 104 is an integrated custom contoured master console cabinet provided for installation and support of electronic surveillance equipment and a master control panel 106 for operating the same. The cabinet 104 contains a plurality of fixed shelves 105 to accommodate the equipment and is adapted for electrical installation of the equipment with DC and AC electrical outlets being provided. The equipment is protected by the employment of fuses and circuit breakers. The control panel 106 is a built in master control center for use with both currently installed and future equipment wherein excess outlets and supports being provided. A plurality of individual 12-volt DC cigarette lighter receptacles may be installed in the cabinet for connecting to the power.

The control panel 106 comprises at least one 12-volt DC digital volt meter 108, at least one 12-volt DC ammeter 109, at least one 24-hour digital clock 110 and a plurality of switches 112, including toggle and push button switches. The meters are employed for trouble shooting and taking measurements of the auxiliary power system. The auxiliary power system preferably provides at least 1185 reserve capacity minutes for operating the electronic surveillance equipment and environmental systems. The auxiliary power system generally comprises at least one DC battery and at least one AC converted battery, preferably gel cell batteries completely sealed for preventing leakage and venting. The power system also includes at least one 30-amp, 120-volt AC battery charger to recharge the auxiliary batteries from shore power. The charger may also feature a pulsed output to preserve operating life of the battery and automatic shut-down and voltage sensory circuity to prevent boiling of the battery.

The 12-volt DC digital volt meters 108 monitor the auxiliary battery voltage for ascertaining the voltage output therefrom. The volt meter 108 is equipped with a red background light to facilitate identification of the equipment. The 12-volt DC digital ammeter 109 is provided in the control panel 106 to monitor the current drain on the electronic equipment systems for determining the power load. The ammeter 109 also facilitates identification by a green background light for quick and easy identification of measurements being taken. In addition to measuring the power load, the volt meter 108 and ammeter 109 allow for trouble shooting equipment in the event of malfunctions. The 24-hour digital clock 110 is installed for measuring the time and day of any activity realized for maintaining accurate logs. The clock further includes manual reset buttons for reestablishing time zero. The switches 112 installed in the control panel remotely switch power on and off to operate video cameras, still photography cameras, the date and time generator, video motion alarms, video monitors, video recorders, an exhaust fan, fresh air intake fan, gooseneck lights, ceiling lights, audio processor, the wet ice air conditioner, the optional alarm pager recall and any equipment which may be substituted therefor.

The environmental system comprises the typical factory air from the truck while it is running and a quiet auxiliary air conditioning system when the truck is off. The auxiliary air conditioner comprises an air conditioning system constructed with fiberglass tanks for housing and permitting a salt and wet ice mixture that lowers the cooling temperature without corrosion damage to the unit. The unit operates off 12-volt DC and draws 2.5 amps for running two speed blower fans and adjustable air director vents. The air conditioning system may be mounted near the driver side sidewall 14aa and be equipped with a mica laminate top cover to facilitate a work counter. The unit also contains a compartment for storing food and drinks. Air release is controlled by a manually operated drain valve. The rear sidewall 14ad may also include a fresh air intake fan to increase the circulation of cooling air.

Electrical wiring is provided for communicating the control panel with each of the equipment components accommodating all existing equipment and the future installation of additional equipment. Wiring used consists of 41 strand UL approved wire able to withstand temperatures of 105°. Battery cables employed are 600-strand minimum No. 2 cable, with red and black coding for easy identification of the positive and negative leads. All wire is color coded, or should be, and may be numbered at both ends of the terminal points. Terminal barrier strips are provided with jumpers located on the strips to ensure proper electrical connections, load carrying capabilities and trouble shooting. All video and camera control cables may also be numbered for maintenance purposes, for identifying proper connection and for establishing proof of proper connections in the event such an issue is challenged. All BNC, PL-259 and other cable connectors should be of the crimp-on type to ensure positive connections. Flexible steel conduit is provided for encasing the wiring and to help reduce RFI and EMI interference.

The mobile surveillance platform also addresses radio frequency interference (RFI) and electromagnetic interference (EMI) by suppressing RFI and EMI from internal and external sources in order to effectuate high quality, intelligible and identifiable evidentiary audio and video recordings of sufficient clarity. By employing the combination of fiberglass enclosures, signal filters and special antenna grounding techniques, the interference normally caused by RFI and EMI generated in highly conductive surroundings is sufficiently mitigated. For instance, the combination of wood and fiberglass in the module reduces interference problems typically associated with steel enclosures. In addition, special grounding techniques are incorporated comprising the use of a common direct chassis ground together with steel UL approved electrical junction boxes for the cables and terminals. One may also employ the use of 100% shielded wire in twisted pairs and cables for all equipment running inside flexible electrical conduit 40. Interference caused by the air conditioner and fan motors is alleviated by RFI and EMI limiting filters. Moreover, the transmitting and receiving antenna elements may be physically separated an adequate distance in the present surveillance enclosure 14, because of the shell volume 17 and mounts 32a utilized for antenna placement.

As aforementioned, seating for at least one occupant may be provided with a 4" thick foam bench seat cushion 102 having a 2" back cushion for vertical support. To accommodate more than one agent the custom bench measures 60" long.

The camper enclosure module 14 may also include safety equipment such as 2.5 Hallan fire extinguisher and 12-volt DC portable carbon monoxide detector. Storage areas may also be located inside the surveillance compartment in areas such as the main front work counter below the cab slider window, under the cushion bench seat as a slide out drawer or in the battery charger cabinet at the rear of the module. The foregoing storage areas may hold equipment such as the lifting slings, extension cords and a battery charger for tapping shore power.

The following electronic equipment may also be installed depending on the type of surveillance being employed: a color video monitor, three position video camera switchers, a 12-volt DC VHS time lapse recorder, a programmable multi-band synthesized receiver for audio intercept, an audio processing and distribution system, an audio cassette recorder with power supply, a low light black and white video camera, a low light color video camera, a TV lens, a TV lens with auto iris, Bogen Magic Arms with universal camera mounts, and a retractable video scope with hand-held controller.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A surveillance camper enclosure to be inserted into a conventional truck bed of a truck having a cab and a bed said enclosure comprising:

(a) a modular enclosure having a driver side sidewall, a passenger side sidewall, a cab side sidewall and a tailgate side sidewall, said sidewalls forming corners, said sidewalls terminated at the upper end by a roof enclosure panel and terminated at the lower end by a floor enclosure panel to define a sealed internal volume, said lower end defining a well adapted for insertion into a truck bed, said upper end protruding from the truck bed;

(b) means for hoisting the enclosure from the truck bed to another truck bed, said hoisting means comprising:

a plurality of steel plates individually attached proximal to each of said corners between the upper end and the lower end, a plurality of female threaded ports defined by said steel plates, a plurality of male threaded eye bolts threadably mated from outside the enclosure individually with each of said female threaded ports so that said eye bolts define a free unobstructed end, said eye bolts having an opening in said free end for receiving cables used in hoisting such that said enclosure may be lifted from the truck bed and placed in another truck bed;

(c) a plurality of viewing windows individually mounted in openings defined by each of said sidewalls; and (d) means for concealing the internal volume from outside view while allowing viewing of the outside from the internal volume, said means for concealing operatively associated with said plurality of viewing windows, said means for concealing including a plurality of slidable barriers individually disposed adjacent each of said plurality of viewing windows inside the internal volume, wherein one of said plurality of slidable barriers and one of said plurality of viewing windows is aligned with the cab for providing an opening for ingress and egress between the cab and said internal volume and for concealing said internal volume, each of said plurality of slidable barriers comprising at least two opaque panels slidably mounted between two tracks, said tracks attached to said side walls in the internal volume, said tracks allowing each of said at least two opaque panels to define a viewing port.

2. An enclosure as recited in claim 1, further comprising a means for viewing the outside from the roof.

3. An enclosure as recited in claim 1, further comprising a door hinged to a cutout defined by a sidewall for compartment ingress and egress with respect to the outside.

4. An enclosure as recited in claim 1, wherein said concealing means further comprises:

a tint attached to each of said viewing windows, said tint sufficiently dark and reflective such that outside light does not propagate through said tint.

5. An enclosure as recited in claim 2, further comprising a plurality of surveillance equipment mounted within said volume for video and audio monitoring and recording within said enclosure of events occurring outside said enclosure, said video monitoring means electrically connected to selective equipment of said plurality of surveillance equipment.

6. An enclosure as recited in claim 1, further comprising a means for mounting said surveillance equipment in said compartment.

7. An enclosure as recited in claim 1, further comprising:
a passenger side interior sidewall disposed in said volume adjacent said passenger side sidewall defining a first cavity therebetween;
 a driver side interior sidewall disposed in said volume adjacent said driver side sidewall defining a second cavity therebetween; and
 a cab side interior sidewall disposed in said volume adjacent said cab side sidewall defining a third cavity therebetween.

8. An enclosure as recited in claim 1, further comprising:
a means for supporting said sidewalls, said supporting means attached to the interior surface of said sidewalls; and
 a plurality of interior sidewalls each attached to said supporting means adjacent said driver side sidewall, passenger side sidewall and cab side sidewall forming cavities therebetween.

9. An enclosure as recited in claim 8, wherein said supporting means comprises a plurality of wood studs joining each of said side walls respectively to each of said interior side walls so as to define a plurality of cavities therebetween.

10. An enclosure as recited in claim 1, further comprising a plurality of sound receiving and amplifying devices individually disposed in apertures defined by said sidewalls for detecting outside sounds.

11. An enclosure as recited in claim 1, further comprising a periscope viewing port defined by said roof for the passage of a scope to view outwardly up to 360° or to engage in photography or video recording.

12. A surveillance camper enclosure for insertion into a conventional truck bed, said enclosure comprising:

(a) a modular enclosure having a driver side sidewall, a passenger side sidewall, a cab side sidewall, and a tailgate side sidewall forming corners between an upper end and a lower end, said sidewalls terminated at the upper end by a roof enclosure panel and terminated at the lower end by a floor enclosure panel to define an internal volume therein; said lower end defining a well adapted for insertion into a truck bed; said upper end protruding from the truck bed, said tailgate sidewall having an upper tailgate sidewall in registry with a lower tailgate sidewall, said upper tailgate sidewall end being hingedly attached to said roof;

(b) means for hoisting the enclosure from the truck bed to another truck bed, said hoisting means comprising:

a plurality of steel plates individually attached to each of said corners, a plurality of female threaded ports defined by said steel plates, a plurality of male threaded eye bolts threadably mated individually with each of said female threaded ports, said eye bolts having free open ends for attaching cables used for hoisting such that said enclosure may be lifted from said truck bed and placed in another truck bed;

(c) a driver side viewing window mounted in an opening defined by said driver side sidewall;

(d) a passenger side viewing window mounted in an opening defined by said passenger side sidewall;

(e) a cab side viewing window mounted in an opening defined by said cab side sidewall, said cab side viewing window being slidable;

(f) a tailgate side viewing window mounted in an opening defined by said upper tailgate sidewall;

(g) a tint attached to each of said viewing windows, said tint being sufficiently dark and reflective so that outside light does not propagate through said tint;

(h) a driver side track disposed below said driver side viewing window, said driver side track being open ended;

(i) a passenger side track disposed below said passenger side viewing window, said passenger side track being open ended;

(j) a driver side barrier including at least two slidable panels, each of said at least two slidable panels having an edge disposed in said driver side track so that said driver side barrier is adjacent said driver side window for blocking the view from the outside to conceal the internal volume, said at least two slidable panels for sliding to define viewing ports;

(k) a passenger side barrier including at least two slidable panels, each of said at least two slidable panels having an edge disposed in said passenger side track so that said passenger side barrier is adjacent said passenger side viewing window for blocking the view from the outside to conceal the internal volume, said at least two slidable panels for sliding to define viewing ports;

(l) a door hinged to a cutout defined by said lower tailgate sidewall for the ingress and egress between the internal volume and the outside;

(m) a cab side slidable barrier mounted in said cab sidewall adjacent said cab side viewing window for allowing ingress and egress between the cab and said internal volume and for concealing said internal volume; and (n) a plurality of antennas mounted in said volume proximal said sidewalls.

13. An enclosure as recited in claim 12, further comprising
a cab side track disposed below said cab viewing window for mounting an edge of said cab side slidable barrier.

14. An enclosure as recited in claim 12, further comprising: means for supporting said sidewalls attached to the interior surface of at least three of said sidewalls.

15. An enclosure as recited in claim 14, further comprising:
a passenger side internal sidewall mounted to said supporting means in said volume adjacent said passenger side sidewall thereby defining a cavity therebetween;
a driver side interior sidewall mounted to said supporting means in said volume adjacent said driver side sidewall thereby defining a cavity therebetween.
a cab interior sidewall mounted to said supporting means in said volume adjacent said cab sidewall thereby defining a cavity therebetween.

16. An enclosure as recited in claim 15, wherein said antennas are disposed within said cavities and securedly mounted therein.

17. An enclosure as recited in claim 15, wherein said supporting means comprises wood studs joining each of said sidewalls individually to each of said internal sidewalls.

18. A surveillance camper enclosure for insertion into a conventional truck bed, said enclosure comprising:

(a) a modular enclosure having a driver side sidewall, a passenger side sidewall, a cab side sidewall, and a tailgate side sidewall, said sidewalls forming corners between an upper end and a lower end, said sidewalls terminated at the upper end by a roof enclosure panel and terminated at the lower end by a floor enclosure panel to define an internal volume therein, said lower end defining a well adapted for insertion into a truck bed, said upper end and a rigid low tailgate wall at the lower end sharing an edge with said hinged door when closed to form the tailgate side sidewall;

(b) a means for transferring the enclosure from one truck bed to another truck bed by hoisting;

(c) a driver side viewing window mounted in an opening defined by said driver side sidewall:

(d) a passenger side viewing window mounted in an opening defined by said passenger side sidewall;

(e) a cab side viewing window mounted in an opening defined by said cab side sidewall;

(f) a tailgate side viewing window defined by said door hinged to said roof;

(g) a tint attached to each of said viewing windows, said tint being sufficiently dark and reflective so that outside light does not propagate through said tint;

(h) a plurality of framing studs attached to the interior of said sidewalls for supporting said sidewalls;

(i) a passenger side interior sidewall mounted against said framing studs adjacent said passenger side sidewall defining a cavity therebetween, said passenger side sidewall defining an opening in alignment with said passenger side viewing window;

(j) a driver side interior sidewall mounted against said framing studs adjacent said driver side sidewall defining a cavity therebetween, said driver interior sidewall defining an opening in alignment with said driver side viewing window;

(k) a cab side interior sidewall mounted against said framing studs adjacent said cab side sidewall defining a cavity therebetween, said cab interior sidewall defining an opening in alignment with said cab side viewing window;

(l) a driver side slidable barrier disposed in the opening defined by said driver interior sidewall for blocking the view of said volume from the outside to conceal said internal volume, said driver side barrier including two slidable panels for creating viewing ports;

(m) a passenger side slidable barrier disposed in the opening defined by said passenger interior sidewall for concealing said internal volume, said passenger side barrier including two slidable panels for creating viewing ports;

(n) a cab side slidable barrier disposed in the opening defined by said cab interior sidewall for concealing said internal volume, said cab side barrier including two slidable panels for creating viewing ports;

(o) a plurality of surveillance equipment mounted in said internal volume for video recording, still photography, sound recording and communications;

(p) a means for mounting said surveillance equipment in said volume;

(q) a door hinged to a cutout defined by said lower tailgate wall for ingress and egress between said volume and the outside;

(r) a plurality of antennas mounted in said cavities, said antennas in communication with said surveillance equipment;

(s) a periscope viewing port defined by said roof for the passage of a periscope to view outwardly 360° or to engage in photography or video recording.

(t) a plurality of sound receiving and amplifying devices individually disposed in apertures defined by said sidewalls for detecting outside sounds.

19. An enclosure as recited in claim 18, wherein said transferring means comprises a plurality of steel plates individually attached to each of said corners;

a plurality of female threaded ports defined by said steel plates and said sidewalls;

a plurality of male threaded eye bolts for mating individually with each of said ports, said eye bolts for attaching to a means for hoisting, such that said enclosure may be lifted from said truck bed and placed in another truck bed.

\* \* \* \* \*